United States Patent [19]

Schuurmans et al.

[11] 4,349,360
[45] Sep. 14, 1982

[54] FLUID TREATING COLUMN AND APPARATUS FOR TREATING MIXTURES OF LIQUID AND GAS

[75] Inventors: Hubertus J. A. Schuurmans; Andre T. M. Peer, both of Amsterdam, Netherlands

[73] Assignee: Shell Oil Company, Houston, Tex.

[21] Appl. No.: 270,304

[22] Filed: Jun. 4, 1981

[30] Foreign Application Priority Data

Sep. 18, 1980 [GB] United Kingdom ................ 8030134

[51] Int. Cl.³ ...................... B01D 47/12; B01D 45/08
[52] U.S. Cl. ..................................... 55/238; 55/347; 55/348; 55/391; 55/396; 55/398; 55/424; 55/457; 261/79 A
[58] Field of Search ................ 55/347, 348, 391, 396, 55/398, 423, 424, 456, 457, 238; 261/79 A

[56] References Cited

U.S. PATENT DOCUMENTS

| | | | |
|---|---|---|---|
| 791,517 | 6/1905 | Walker | 55/396 |
| 2,284,513 | 5/1942 | Coward | 55/398 |
| 3,345,046 | 10/1967 | Versluys et al. | 55/423 |
| 3,488,927 | 1/1970 | Jepsen et al. | 55/424 |
| 3,796,026 | 3/1974 | Mugford | 55/348 |
| 4,015,960 | 4/1977 | Nutter | 55/318 |
| 4,238,210 | 12/1980 | Regehr et al. | 55/396 |

Primary Examiner—David L. Lacey

[57] ABSTRACT

Mixtures of gas and liquid are treated and separated within a housing containing one apparatus or a column containing a plurality of apparatuses where each apparatus contains a tubular wall defining an inner space and a surrounding outer space, inlet means for supplying a mixture of liquid and gas into the inner space, swirl-imparting means within the inner space for imparting a rotary motion to separate the mixture of liquid and gas and outlet means for separately discharging the liquid and gas.

5 Claims, 7 Drawing Figures

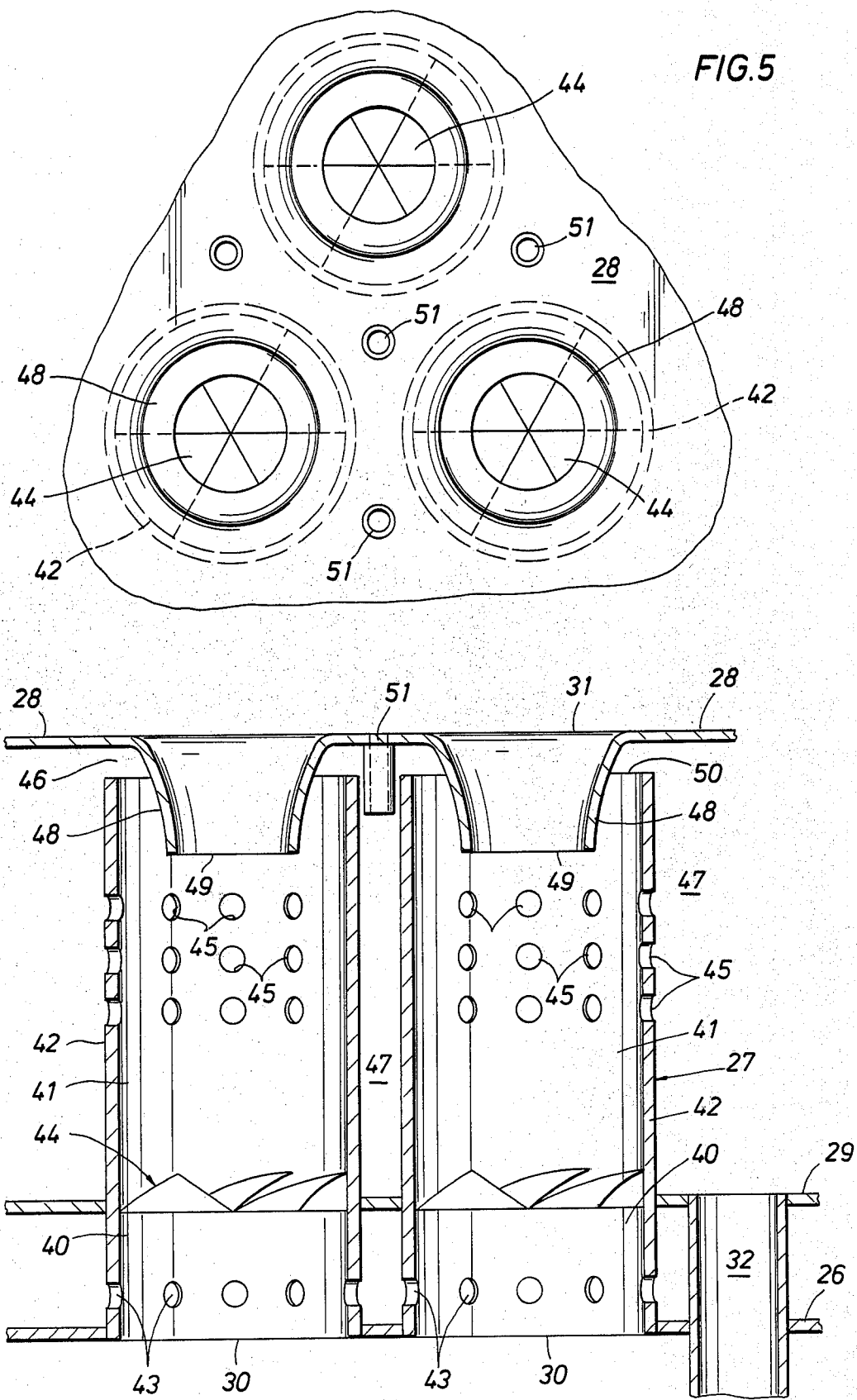

FLUID TREATING COLUMN AND APPARATUS FOR TREATING MIXTURES OF LIQUID AND GAS

BACKGROUND OF THE INVENTION

The present invention relates to an apparatus for treating mixtures of liquid and gas, comprising a tubular wall defining an inner space and an outer space, inlet means for supplying a mixture of a liquid and gas into said inner space, swirl imparting means inside the inner space for imparting a rotary movement to the mixture of liquid and gas to separate the liquid and the gas, and outlet means for separately discharging the liquid and the gas from the inner space.

The term "gas" is taken throughout this specification also to include vapor.

Apparatuses of the above-mentioned type are suitable for use in columns for separating liquid/gas mixtures, as well as in columns for contacting liquids and gases for creating an exchange of matter and/or heat between the phases, followed by separating the phases. In such columns such apparatuses are mounted in or over openings in a tray arranged within the column.

When the above-mentioned apparatus is applied in columns for contacting liquids and gases, the apparatus is provided with a mixing chamber having separate liquid and gas inlet means. In said mixing chamber the liquid is atomized in the supplied gas stream so that matter and/or heat between the liquid and gas may be exchanged. The mixture of liquid and gas is supplied to swirl imparting means for subsequently separating the liquid from the gas stream.

Apparatuses of the above-mentioned type are widely used in the oil and chemical industry.

An example of such apparatuses is described in British Pat. No. 1,123,546. That apparatus comprises a cylindrical wall enclosing an inner space. A vane assembly is arranged within the inner space for separating liquid from a gas stream. The separated liquid may be discharged from the inner space partly through liquid discharge openings provided in the cylindrical wall and partly over the upper edge of said wall.

Another example of an apparatus for treating mixtures of liquid and gas is described in U.S. Pat. No. 4,015,960. That apparatus comprises an inner space enclosed by a tube and provided with blades for imparting a rotary movement to a mixture of liquid and gas introduced into said inner space via the open lower end of the tube. The liquid, separated from the gas stream by the action of said blades, is subsequently discharged from the inner space via an opening in the wall of the tube. Said opening is arranged on approximately the same level as the blades. The remaining gas stream is discharged from the inner space via an outlet tube arranged coaxially with the main tube and having the lower end thereof arranged inside said main tube.

The above-mentioned known apparatuses provide a satisfactory separating action at rather limited flow velocities of the mixtures to be treated and at rather low liquid loadings. But, an increase of the flow velocity and/or liquid loading causes a decrease of the separating action. This decrease is due to re-entrainment of liquid by the gas stream on leaving the inner space of the treating apparatus.

The object of the present invention is to provide an apparatus for treating mixtures of liquid and gas which apparatus has a higher efficiency, even at high flow velocities and/or high liquid loadings than the known apparatus.

SUMMARY OF THE INVENTION

The present invention relates to an apparatus for treating a mixture of gas and liquid. It includes a housing which surrounds rounds at least one tubular inner wall that defines a generally vertical tubular inner space and a generally annular space within the housing. The top wall of the housing is located above the top of the tubular inner wall so that fluid can flow between the surfaces of those walls. Inlet means are provided for inflowing a mixture of gas and liquid into the bottom of the tubular inner space. Swirl imparting means are mounted within the tubular inner space for centrifugally separating the inflowing mixture into its gas and liquid components. Outflow means for discharging gas from the tubular inner space and housing are arranged to provide: (a) a primary gas outlet tube which is coaxial with the inner space, has an upper end which extends above the top wall of the housing, and has a lower end which is smaller than the tubular inner space, extends into that space, and opens below the top of the tubular inner wall and (b) at least one secondary gas outlet tube which extends above the top wall of the housing and there communicates with the primary gas outlet tube and extends below the top wall of the housing and opens above a portion of the generally annular space; and, outlet means for discharging liquid from the tubular inner space and housing are arranged to provide (a) at least one opening through the tubular inner wall in a location above the swirl imparting means, for discharging liquid from within the tubular inner space to within the generally annular space, and (b) at least one opening through a lower portion of the housing for discharging fluid from within the generally annular space to a location outside the housing.

DESCRIPTION OF THE DRAWING

FIG. 4 shows detail 4 of FIG. 3 on a larger scale.

FIG. 5 shows a top view of the apparatus shown in FIG. 4.

DESCRIPTION OF THE INVENTION

Figure 1:
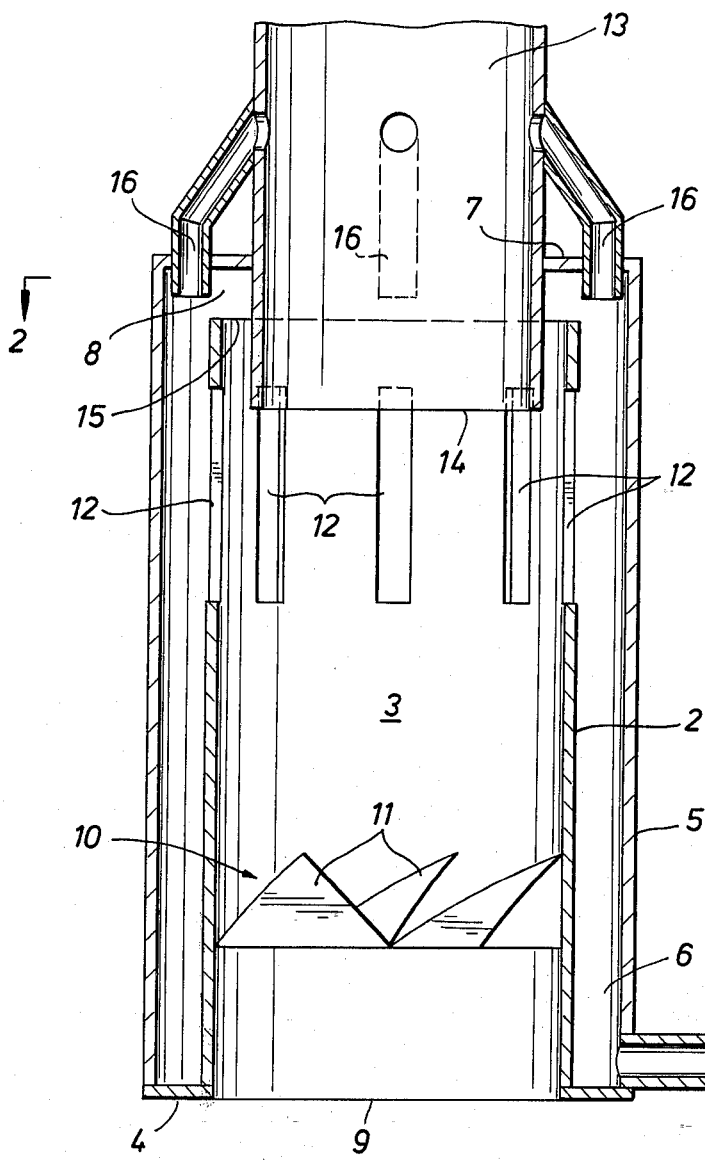
FIG. 1 shows a vertical cross-section of a first embodiment of the invention.

In the drawings specific liquid discharge means are shown in association with specific gas outlet means and these means are arranged in certain specific positions relative to each other. However, it should be understood that these associations and positions are merely illustrative and that the illustrated features may be applied individually to other embodiments.

Figure 2:
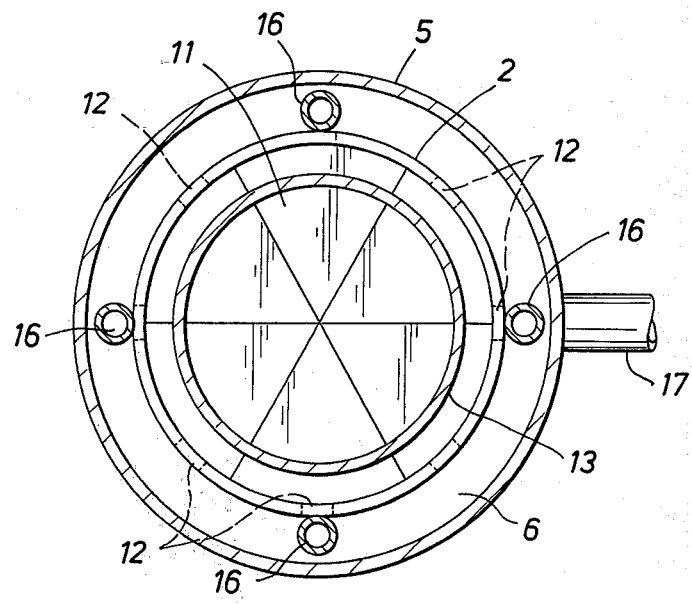
FIG. 2 shows a cross-section along line 2—2 of FIG. 1.

FIGS. 1 and 2 show an apparatus according to the invention for treating mixtures of liquid and gas. This apparatus is also designated hereinafter by the expression swirl tube.

The swirl tube 1 contains a tubular inner wall, such as a cylindrical wall 2, enclosing an inner generally vertical tubular separating space 3. The tubular inner wall 2, being mounted on a bottom plate 4, is surrounded by an enveloping wall or housing 5. Between the wall 2 and the housing 5 a generally annular outer space or liquid discharge space 6 is present. The outer space is confined in downward direction by the housing bottom plate 4 and in upward direction by a housing top wall 7. Said top wall 7 is arranged at some distance above the cylindrical wall 2, thereby creating a fluid passage 8 between the inner tubular space 3 and the annular outer space 6. Through an inlet opening 9 of the swirl tube 1 a gas/liquid mixture may be supplied to a swirl imparting means, such as a vane assembly 10, consisting of a number of blades 11 arranged inside the inner space 3. The tubular inner wall 2 is provided with a number of longitudinal liquid discharge openings 12, for discharging liquid from within the tubular inner space 3 to the annular space 6.

A primary gas outlet tube 13 passing through the housing top wall 7 has the lower end 14 thereof arranged below the upper end 15 of the tubular inner wall 2 thereby extending into the tubular inner space 3. The outlet tube 13, vane assembly 10 and tubular inner space 3 are substantially coaxially arranged relative to each other.

A number of secondary gas outlet tubes 16 pass through the top wall 7 and extend into locations vertically aligned with the annular outer space 6. These secondary gas outlet tubes 16 form a fluid communication between the upper part of the space 6 and the interior of the primary gas outlet tube 13. Finally, the swirl tube 1 comprises a liquid outlet tube 17 having an end thereof arranged in an opening in the lower part of the enveloping wall 5, for discharging liquid from the outer space 6.

In operation, a mixture of liquid droplets and gas is introduced into the separating space 3 of the swirl tube via the inlet opening 9. In the separating space 3 the gas/liquid mixture passes through the vane assembly 10, which imparts a rotary movement to the mixture. The rotary movement causes the liquid droplets to be centrifugally forced outwardly so that they impinge and coalesce on the inner surface of the wall 2. Some of the liquid accumulated on the inner surface of that wall flows through the openings 12 while some flows over the upper edge 15 of the wall 2. The liquid is collected in the lower part of the generally annular liquid discharge space 6 and is discharged from there via the outlet tube 17.

The major part of the gaseous component of the gas/liquid mixture is discharged from the separating space 3 via the primary gas outlet tube 13. In order to avoid entrainment of the liqid layer (formed along the inner surface of the wall 2 by the centrifugal action of the swirl-imparting vane assembly 10) by the gas stream flowing along that layer, the cross-sectional area of the gas outlet tube 13 should be substantially smaller than the cross-sectional area of the separating space 3.

A suitable cross-sectional area for the gas outlet tube 13 may be chosen within the range of 15 to 65 percent of the cross-sectional area of the space 3. In this range of cross-sectional areas an effective separation of liquid from a gas stream can be obtained without a significant increase in the amount of pressure drop which is caused by flowing the gas stream treated through the swirl tube apparatus.

The liquid entering into the outer space 6 tends to contain small amounts of gas. This gas is discharged from said outer space 6 via the secondary gas outlet tubes 16. During the discharge of liquid from the separating space 3 over the upper end of the cylindrical wall 2, a liquid film will be formed on the top wall 7. By positioning the lower ends of the gas outlet tubes 16 below the top wall 7 entrainment of liquid from that film by the gas stream leaving the swirl tube via the outlet tubes 16 is avoided.

To minimize entrainment of liquid collected on the inner surface of the wall 2, by the gas stream leaving the swirl tube via the primary gas outlet tube 13, the lower end 14 of said outlet tube 13 is arranged below the upper end of the liquid discharge openings 12. This arrangemeent enables the liquid collected on the inner surface of the wall 2 above the openings 12 to leave the inner space 3 along two discharge ways. It can flow down to and through the openings 12 or up and over the wall 2 along the fluid passage 8 above the upper end 15 of the wall 2. This avoids having any liquid flowing down along the inner side of the wall 2 to a level below the lower end 14 of the gas outlet tube 13 where it might be subjected to the entrainment action of the gas stream entering the outlet tube.

Figure 3:
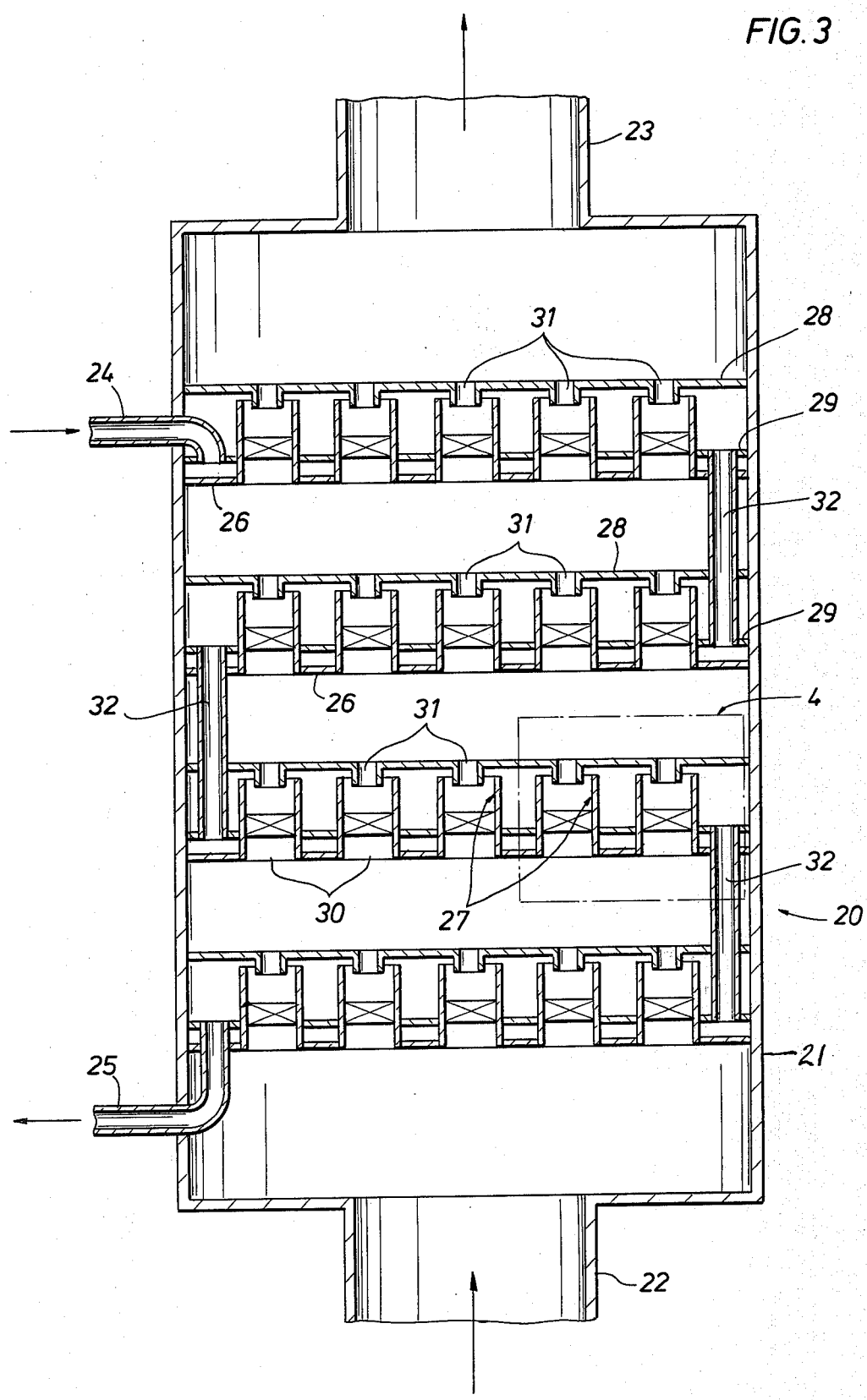
FIG. 3 shows a vertical cross-section of a column provided with a second embodiment of the invention.

Reference is now made to FIG. 3 shows a plurality of swirl tubes in a column 20. In such a column liquids can be contacted with gases for the exchange of matter and/or heat between phases, for instance, for the separation of hydrocarbon mixtures by distillation or the absorption of a gas or a component from a mixture of gases with the aid of a liquid.

In the column 20, a column wall 21 provides a housing for a series of swirl tubes 27. The column housing wall 21 is provided with means for the supply into and the discharge from the interior of the colunn 20 of fluids. These means are formed by a gas inlet tube 22, a gas outlet tube 23, a liquid inlet tube 24 and a liquid outlet tube 25. A number of parallel trays 26 are arranged in the interior of the column 20. Each of the trays 26 is provided with a plurality of swirl tubes 27 for treating a mixture of liquid and gas. The swirl tubes 27, being mounted in openings 30 in the trays 26 will be discussed in more detail hereinafter with reference to the FIGS. 4 and 5.

Parallel to each of the trays 26 two parallel walls 28 and 29 are arranged. Each wall 28 is provided with a plurality of openings 31 for an upward discharge of gas from the tray 26 immediately below that wall. The space between each pair of walls 28 and 29 provide top and bottom housing walls for the swirl tubes on the immediately adjacent tray 26.

As shown in FIG. 4 each swirl tube apparatus 27 comprises a mixing chamber 40 below a tubular inner space 41 which forms the separating chamber of a swirl tube. The chambers 40 and 41 are enclosed by a cylindrical wall 42 and separated from each other by a vane assembly 44. The mixing chamber 40 is provided with a number of liquid supply openings 43 arranged in the lower part of the wall 42. A number of circular liquid discharge openings 45 are arranged in the upper part of the cylindrical wall 42.

The horizontal wall 28 is arranged at some distance above the upper end 50 of the cylindrical wall 42, thereby creating a fluid passage 46 between the tubular inner space or separating chamber 41 and a generally annular space (also called liquid discharge space) 47. The outer space 47 is confined in lateral direction by the column housing wall 21 (see FIG. 3).

A number of conically shaped primary gas outlet tubes 48 communicate at their upper ends with the openings 31 in the wall 28. The lower end 49 of each primary gas outlet tube 48 is positioned inside a separating chamber 41 below the upper end 50 of a wall 42. Each swirl tube 27 contains a number of secondary gas outlet tubes 51, positioned in openings in the wall 28 vertically above portions of the generally annular space 47 (see FIG. 5).

The operation of the column 20 (see FIG. 3) will now be described with reference to FIGS. 3 and 4. Via gas inlet tube 22 and liquid inlet tube 24 gas and liquid are supplied into the interior of the column 20. After a short timelag the interior of the column is filled with liquid and gas.

The gas and liquid simultaneously enter into each of the mixing chambers 40 on a tray 26 via openings 30 and 43, respectively. In each mixing chamber the liquid is subsequently atomized in the supplied gas stream, and a mixture of liquid drops and gas is formed; which allows an exchange of matter and/or heat between the liquid and the gas. This mixture is subsequently forced to pass the swirl imparting means 44, so that a centrifugal force is imposed on the mixture. Due to the centrifugal force the liquid droplets are thrust outwardly and impinge and coalesce on the inner surface of the cylindrical wall 42 of each separating chamber 41. The major part of the gas stream is removed from the separating chambers 41 via the primary gas outlet tubes 48. The liquid separated from the gas stream and collected on the walls 42 is discharged from the separating chambers 41 partly via the openings 45 in the walls 42 and partly over the upper ends 50 of the walls 42.

The liquid discharged from the separating chambers 41 is subsequently collected on the horizontal wall 29. The liquid on the wall 29 flows through the tubes 32 to a next lower tray 26. To this end the tubes 32 pass through the immediately adjacent tray 26 and the walls 28 and 29 pertaining to a next lower tray 26. The liquid collected on said next lower tray 26 is then treated by swirl tubes 27 on that tray 26. Once the liquid has reached the lower-most tray 26 in the column 20 and has been treated by the swirl tubes on it, the liquid is removed from the interior of the column 20 through the liquid outlet tube 25.

Gas entrained by the liquid on leaving the separating chambers 41, is discharged from the outer space 47 surrounding those chambers through the second gas outlet tubes 51. The gas leaving the separating chambers 41 via the primary gas outlet tubes 48 and the gas leaving the outer space 47 via the secondary gas outlet tubes 51 flow in upward direction and enter the swirl tubes 27 on a next upper tray 26.

Upon arrival at said next upper tray 26 the gas is first mixed with liquid and subsequently separated from liquid in the same manner as discussed in the above. Once the gas has passed through the apparatuses 27 on the uppermost tray 26 in the column 20, the gas is removed from the interior of the column 20 via the gas outlet tube 23.

Figure 6:
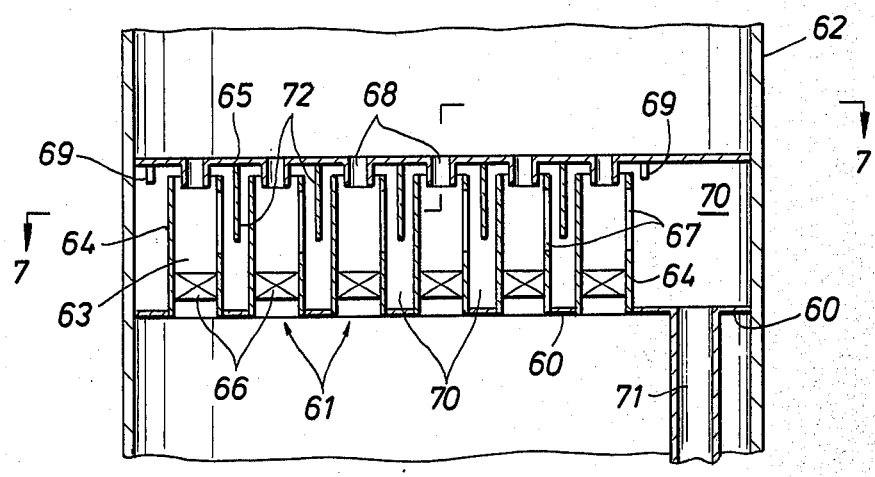
FIG. 6 shows a vertical cross-section of a column tray provided with a third embodiment of the invention.
Figure 7:
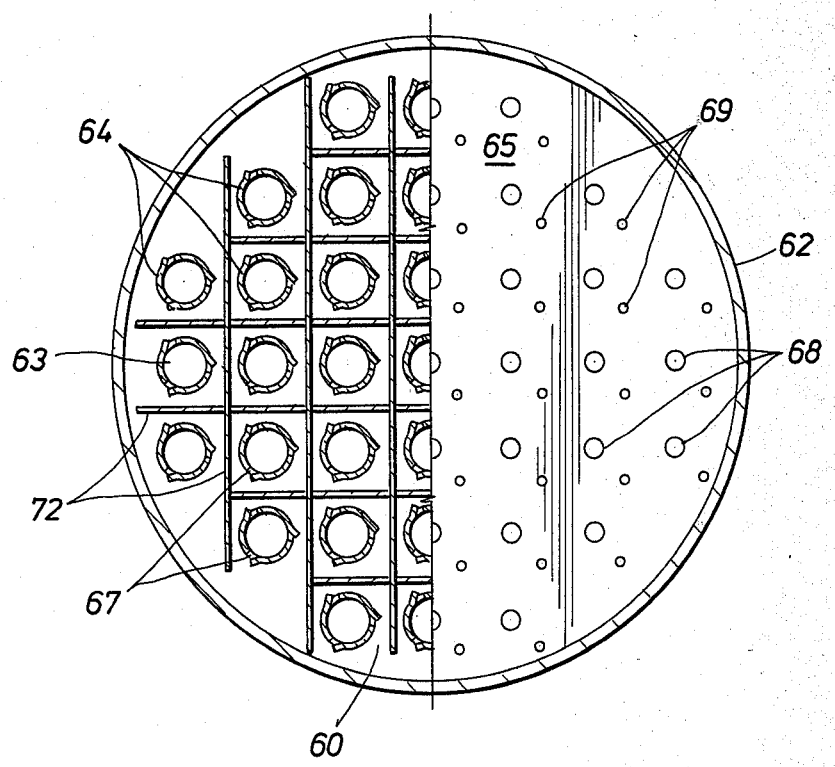
FIG. 7 shows cross-section 7—7 of the column tray shown in FIG. 6.

Referring now to FIGS. 6 and 7, a column tray 60 provided with swirl tubes 61 for separating gas/liquid mixtures is shown. The tray 60 is arranged in a column for separating gas/liquid mixtures. Part of the column wall, indicated by reference numeral 62, is shown in FIG. 6. The column is provided with suitable, not shown, means for the supply of gas/liquid mixtures into the interior of the column and for the separate discharge of liquid and gas from the column.

As shown in FIG. 6, each swirl tube 61 contains an inner space (also indicated as separating chamber) 63 being enclosed by a cylindrical wall 64. At some distance above the upper ends of said walls 64 a wall 65 is arranged parallel to the tray 60. Means 66 for imparting a rotary movement to gas/liquid mixtures in the inner space 63 are schematically shown. Those parts of the walls 64, which are positioned downstream of said swirl imparting means 66 are provided with longitudinal tangential openings 67, formed by locally cutting and bending said walls 64.

For the discharge of gas from the separating chambers 63 primary gas outlet tubes 68 are arranged in openings in the wall 65. The wall 65 is furthermore provided with secondary gas outlet tubes 69. These secondary gas outlet tubes 69 form a passage for gas collected in the outer space 70 surrounding the apparatuses 61. The outer space is confined in lateral direction by the column wall 62.

For removing liquid from the outer space 70, a tube 71 is arranged in an opening of the tray 60.

In operation, a gas/liquid mixture supplied into the interior of the column having the column wall 62 flows upwardly and passes through the separating chambers 63 on the tray 60. By the action of the swirl-imparting means 66 the liquid is separated from the gas stream and is forced to leave the separating chamers 63 partly through the openings 67 and partly over the upper ends of the cylindrical walls 64.

In order to prevent liquid discharged from a separating chamber 63 from hampering the liquid discharge from an adjacent separating chamber 63, skirts 72 are arranged between adjacent chambers 63. The skirts 72 are secured to the wall 65 and have their lower ends arranged at least below the lower ends of the longitudinal openings 67 in the cylindrical walls 64. As shown in FIG. 7 the skirts may form an enveloping wall having a square shape in cross section.

The liquid discharged from the separating chambers 63 is collected in the outer space 70. Through the tube 71 the liquid subsequently passes to the bottom part of the column, where the liquid is removed from the interior of the column by liquid discharge means (not shown).

The major parts of the gas streams having passed the swirl-imparting means 66 flow in upward direction through the primary gas outlet tubes 68. Gas, entrained by the liquid on leaving the separating chambers 63, will flow in upward direction through the secondary gas outlet tubes 69. The gas from the outlet tubes 68 and 69 is removed from the interior of the column by gas discharge means (not shown) arranged downstream of the wall 65.

It will be appreciated that instead of a single liquid discharge tube 71, a plurality of tubes may be applied for removing liquid from the outer space 70 towards the bottom part of the column.

The invention is not restricted to treating apparatuses comprising cylindrically shaped walls 2, 42 and 64. Any type of tubular wall may advantageously be applied, such as rectangularly shaped tubular walls. Moreover, the cross-sectional area over the length of the tubular wall does not need to be constant.

Although according to FIGS. 3, 4 and 6 the tubular walls of the apparatuses are mounted in openings of a tray, said tubular walls may also be mounted over the openings of a tray.

The present invention is not restricted to the particular type of swirl-imparting means as shown in FIGS. 1 and 3 and indicated with reference numbers 10 and 44, respectively. Instead thereof, a hub with blades may, for example, be applied.

Further, the invention is not restricted to tubular walls with liquid discharge openings of the types shown in the drawings. Instead thereof, the liquid discharge openings may for example, be formed by cutting and stretching part of a tubular wall into a lattice.

It is remarked that the present invention is not restricted to apparatuses provided with enveloping walls having configurations as shown in the FIGS. 1, 2 and 6. For example, enveloping walls having a hexagonal configuration may also advantageously be applied.

It is noted that the total cross-sectional area of the secondary gas outlet tubes 16, 51, 69 of each apparatus preferably amounts to at least 6 percent of the total cross-sectional area of the primary gas outlet tubes 13, 48 and 68, respectively. With respect to the gas outlet tubes 48 the cross-sectional area is interpreted as the minimum cross-sectional area.

Finally, the area of the fluid passages 8 and 46 is preferably at most 30 percent of the area occupied by the liquid discharge openings 12 and 45, respectively.

What is claimed is:

1. An apparatus for treating a mixture of gas and liquid comprising:
    a housing which surrounds a tubular inner wall that defines a generally vertical tubular inner space and a surrounding outer space within the housing;
    a top wall of the housing located above the top of the tubular inner wall so that fluid can flow between the surfaces of those walls;
    inlet means for inflowing a mixture of gas and liquid into the bottom of the tubular inner space;
    swirl-imparting means mounted within the tubular inner space for centrifugally separating said mixture into its gas and liquid components;
    outlet means for discharging gas from the tubular inner space and said outer space including (a) a primary gas outlet tube which is coaxial with the tubular inner space, extends through the top wall of the housing and has a lower end which is smaller than the tubular inner space and extends into a portion of that space below the top of the tubular inner wall, and (b) a secondary gas outlet tube which extends through the top wall of the housing and there communicates with the primary gas outlet tube and extends below the top of the housing and there opens over a portion of said outer space;
    at least one opening through said tubular inner wall in a location above the swirl-imparting means, for discharging liquid from within the tubular inner space to within the said outer space; and,
    at least one opening through a lower portion of the housing for discharging liquid from within said outer space to a location outside the housing.

2. The apparatus of claim 1 in which the housing and tubular inner wall are generally cylindrical.

3. The apparatus of claim 1 or 2 in which the cross-sectional area of the primary gas outlet tube is from about 15 to 65 percent of that of the inner tubular space.

4. The apparatus of claim 3 in which the total cross-sectional area provided by said secondary gas outlet amounts to at least about 6 percent of that provided by said primary gas outlet.

5. A fluid-treating column containing a plurality of apparatuses for treating a mixture of gas and liquid comprising:
    a generally columnar housng which surrounds a plurality of tubular inner walls which each define a generally vertical tubular inner space and a surrounding outer space within the generally columnar housing;
    generally horizontal walls which are arranged within the generally columnar housing so that at least a portion of a horizontal wall is located above the top of each tubular inner wall and fluid can flow between the adjacent surfaces of those walls;
    inlet means for inflowing a mixture of gas and liquid into the bottom of each tubular inner space;
    swirl-imparting means mounted within each tubular inner space for centrifugally separating the inflowing mixture into its gas and liquid components;
    outlet means for discharging gas from each tubular inner space and surrounding outer space to a location above the adjacent horizontal wall, including (a) a primary gas outlet tube which is coaxial with the tubular inner space, extends upward through the adjacent horizontal wall and has a lower end which is smaller than the tubular inner space and extends downward into a portion of that space below the top of the tubular inner wall, and (b) at least one secondary gas outlet tube which extends upward through the adjacent horizontal wall and there communicates with the primary gas outlet tube and extends below that horizontal wall and there opens over a portion of said surrounding outer space;
    at least one opening through each tubular inner wall in a location above the swirl-imparting means, for discharging liquid from within the tubular inner space to within said surrounding outer space; and,
    at least one passageway which extends from within each of said surrounding outer spaces to an opening through a lower portion of the generally columnar housing for discharging liquid from within said surrounding outer spaces to a location outside the housing.

* * * * *